United States Patent
Singleton et al.

(10) Patent No.: US 9,485,999 B2
(45) Date of Patent: Nov. 8, 2016

(54) SEA CUCUMBER PROCESSING APPARATUS AND METHOD

(71) Applicant: GENESIS GROUP INC., St. John's (CA)

(72) Inventors: Joseph Singleton, St. Johns's (CA); Mark Ingerman, Petty Harbour (CA); Stephen King, St. John's (CA)

(73) Assignee: MEMORIAL UNIVERSITY OF NEWFOUNDLAND, St. John's, Newfoundland (CA)

( * ) Notice: Subject to any disclaimer, the term of this patent is extended or adjusted under 35 U.S.C. 154(b) by 0 days.

(21) Appl. No.: 14/421,899

(22) PCT Filed: Aug. 15, 2013

(86) PCT No.: PCT/CA2013/050632
§ 371 (c)(1),
(2) Date: Feb. 16, 2015

(87) PCT Pub. No.: WO2014/026291
PCT Pub. Date: Feb. 20, 2014

(65) Prior Publication Data
US 2015/0216195 A1 Aug. 6, 2015

Related U.S. Application Data

(60) Provisional application No. 61/683,347, filed on Aug. 15, 2012.

(51) Int. Cl.
*A22C 25/00* (2006.01)
*A22C 29/00* (2006.01)
*A22C 25/14* (2006.01)

(52) U.S. Cl.
CPC .............. *A22C 29/00* (2013.01); *A22C 25/00* (2013.01); *A22C 25/14* (2013.01); *A22C 25/145* (2013.01); *A22C 25/147* (2013.01)

(58) Field of Classification Search
CPC .... A22C 25/00; A22C 25/003; A22C 25/08; A22C 25/14; A22C 29/00; A22C 29/02
USPC .......................... 452/1, 8–10, 12, 15, 18, 19
See application file for complete search history.

(56) References Cited

U.S. PATENT DOCUMENTS 2,660,754 A * 12/1953 Roshko .............................. 452/8
2,987,759 A * 6/1961 Lapeyre et al. ................... 452/9

(Continued)

FOREIGN PATENT DOCUMENTS

| CN | 101606730 | 12/2009 |
|---|---|---|
| CN | 201409414 | 2/2010 |

(Continued)

OTHER PUBLICATIONS

DFO. 2009. An Assessment of the Sea Cucumber (*Cucumaria frondosa*) Resource on the St. Pierre Bank in NAFO Subdivision 3Ps. DFO Can. Sci. Advis. Sec. Sci. Advis. Rep. 2009/044.

(Continued)

*Primary Examiner* — Richard Price, Jr.
(74) *Attorney, Agent, or Firm* — Bereskin & Parr LLP/S.E.N.C.R.L., s.r.l.

(57) ABSTRACT

An improved apparatus for processing sea cucumbers having stages for orienting/aligning, cutting, splitting, flattening, eviscerating and cleaning the sea cucumber, and for collecting the eviscerated innards. A method for the automated splitting and evisceration of sea cucumbers using the apparatus of the present disclosure. A flattening plate and trough during the orienting/aligning step relax the sea cucumber and discourage its defence mechanisms. A wedge shaped flattening plate splits and flattens the sea cucumber immediately after the incision. Pronged discs maintain positioning of the sea cucumber during an aggressive wash and brush cleaning cycle, which may be repeated. Optionally, a vacuum may suction off a portion of the innards prior to cleaning.

20 Claims, 16 Drawing Sheets

(56) References Cited

U.S. PATENT DOCUMENTS

| | | | |
|---|---|---|---|
| 3,867,740 A | | 2/1975 | LaPine et al. |
| 3,947,921 A | * | 4/1976 | Berk ............................. 452/19 |
| 4,008,508 A | | 2/1977 | LaPine et al. |
| 4,019,224 A | * | 4/1977 | Amaria et al. ................... 452/1 |
| 4,121,322 A | * | 10/1978 | Rutledge .......................... 452/9 |
| 5,364,301 A | * | 11/1994 | Kestner et al. ................ 452/18 |
| 6,042,465 A | * | 3/2000 | Larson et al. ..................... 452/9 |
| 2009/0325474 A1 | | 12/2009 | Batson |

FOREIGN PATENT DOCUMENTS

| | | |
|---|---|---|
| CN | 101617837 | 10/2011 |
| CN | 101606730 | 11/2011 |
| CN | 102266086 | 12/2011 |
| CN | 102715568 | 10/2012 |
| CN | 202714158 | 2/2013 |
| CN | 202857778 | 4/2013 |
| CN | 103156210 | 6/2013 |
| CN | 103212555 | 7/2013 |
| CN | 203061492 | 7/2013 |
| JP | 2008054569 | 3/2008 |
| WO | 2007/005349 | 1/2007 |

OTHER PUBLICATIONS

FAO Fisheries and Aquaculture Technical Paper, "Sea Cucumbers: A global review of fisheries and trade", Food and Agriculture Organization of the United Nations, Rome, 2008.

\* cited by examiner

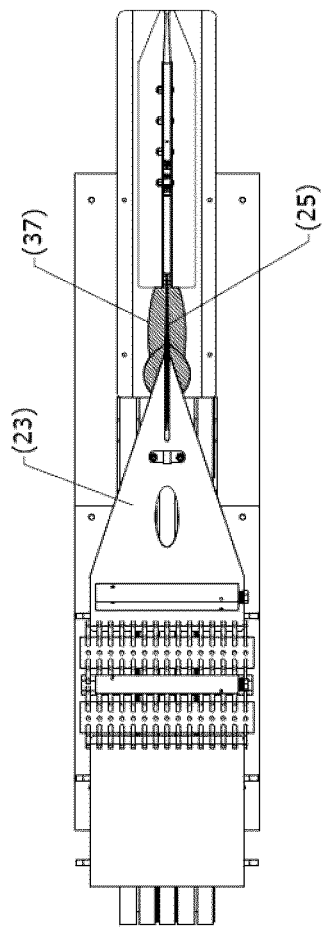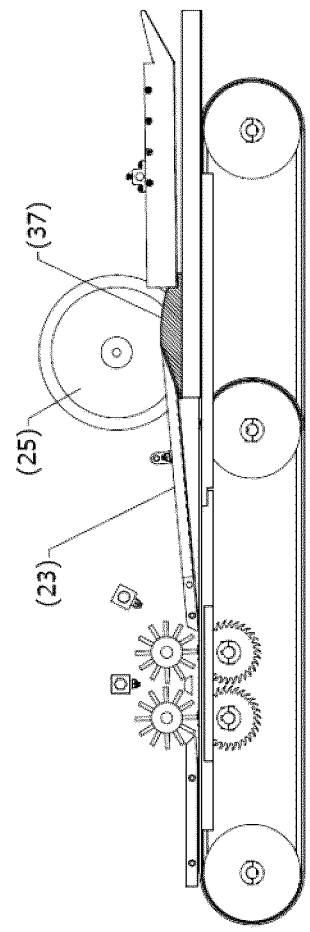
FIGURE 12 (a)
FIGURE 12 (b)

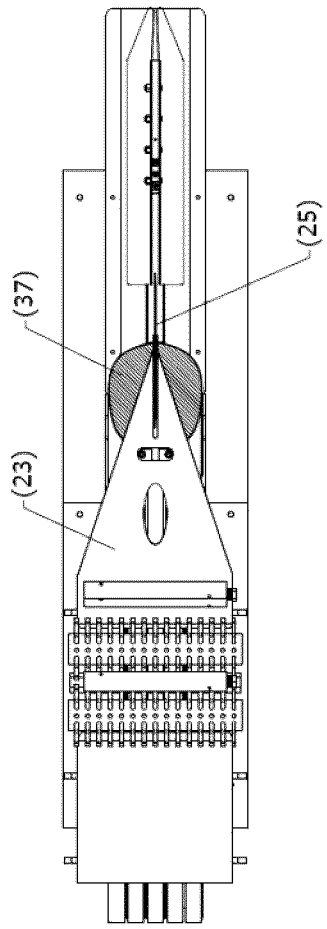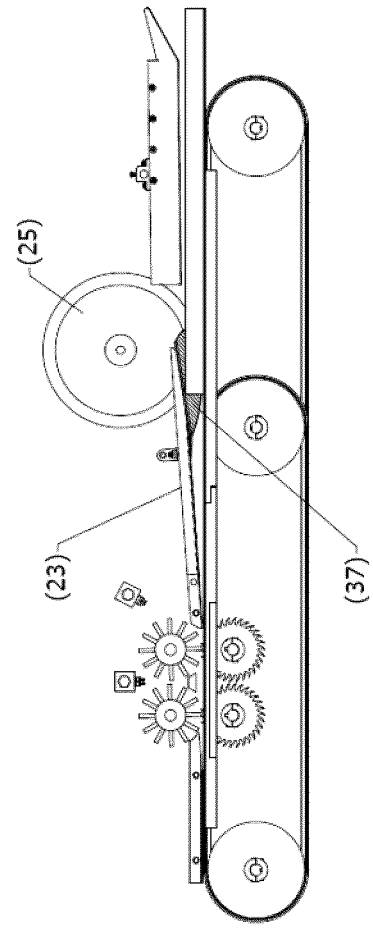
FIGURE 13 (a)
FIGURE 13 (b)

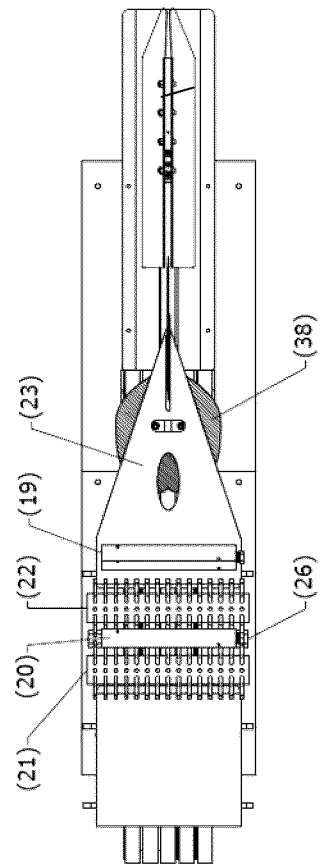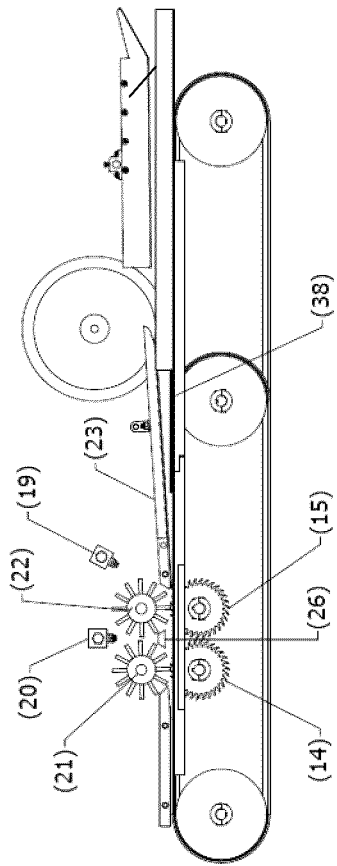
FIGURE 14 (a)
FIGURE 14 (b)

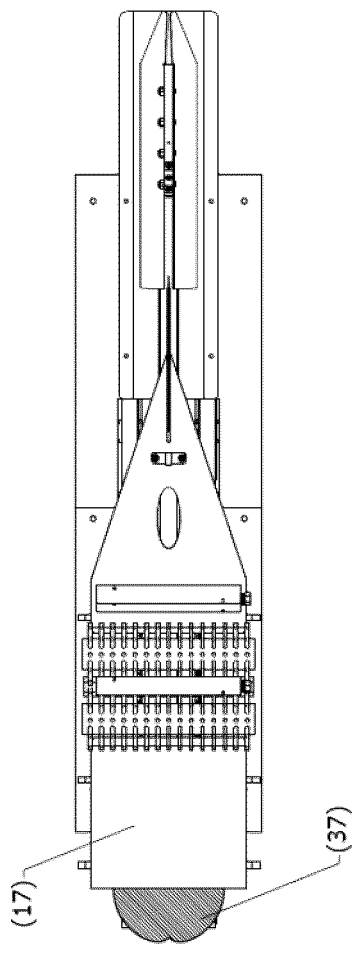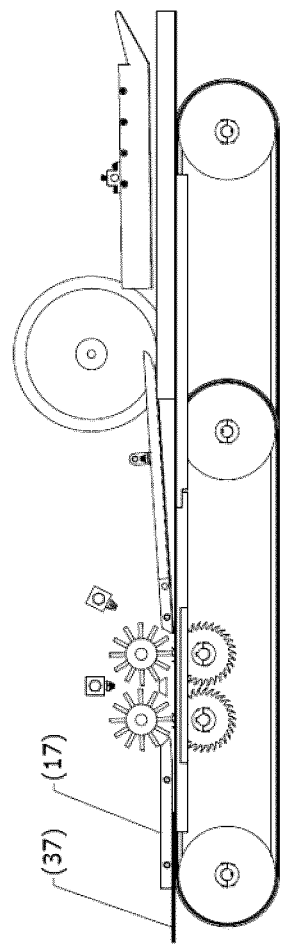
FIGURE 16 (a)
FIGURE 16 (b)

SEA CUCUMBER PROCESSING APPARATUS AND METHOD

FIELD

This invention relates generally to the field of seafood processing; and more specifically to apparatuses and methods for processing sea cucumbers.

BACKGROUND

Sea cucumbers are marine animals from the phylum echinoderm and class Holothuroidea. Of the more than 1250 species worldwide, many are gathered for human consumption or grown in aquaculture systems. Like other echinoderms, sea cucumbers have pentagonal radial symmetry. But unlike starfish, they are oriented with soft, cylindrical bodies like they are lying on their sides. Sea cucumbers have a leathery skin covering an endoskeleton of calcified structures of isolated microscopic ossicles (or sclerietes) joined by connective tissue and five longitudinal muscle bands. The body walls of sea cucumbers are formed of catch collagen fibers, which can be loosened and tightened by the animals, permitted them to either form a hard endoskeleton through their dermis layer or effectively liquefy their connective tissue and pour themselves through small openings and then reconnect the collagen into a firm consistency on the other side. The mouth is located at the oral end, identified by a circle of branching tentacles about it, and the anus opens at the aboral end, defining an aboral/oral axis. The internal organs (viscera) of the sea cucumber lay within the tube-like body chamber also referred to as the coelomic cavity. Certain of the species also discharge the toxic chemical holothurin (named for the class of species) as a defense mechanism when startled.

They range in length from less than 1 centimeter to almost a meter (though most are between 10 cm and 30 cm in length) and in thickness up to 30 cm.

The great variations in size and shape, and the animal's defensive techniques, make it difficult to process either by hand or machine—even within a single species.

SUMMARY

This disclosure relates to certain improvements in automated processing of sea cucumbers, and in particular to the steps of aligning, cutting, splitting, eviscerating and cleaning the sea cucumber, and optionally collecting the eviscerated material.

The apparatus comprises an aligning stage characterized by a narrowing input channel which encourages the sea cucumber to relax the collagen fibers to fit through the input channel. The channel is not so narrow as to excite the defense mechanisms of the sea cucumber, but sufficient to discourage the sea cucumber from hardening. This stage also aligns the sea cucumber along its longitudinally axis (i.e. along its aboral/oral axis) directly in front of a blade. In its simplest form, with the processing direction of the apparatus vertical, the input channel could be a truncated cone through which the sea cucumber is dropped or encouraged to squeeze. In a horizontal operation, conveyor belts pull the sea cucumber through the aligning stage under the blade.

The apparatus may also comprise a cutting/splitting/flattening stage. A blade partially nestled in front of a wedge, and positioned to cut a single longitudinal incision through only one side of the body wall of the sea cucumber as it exits the input channel. A blade extending approximately to the midpoint of the narrow exit from the input channel would suffice, and a shallower or deeper cut is also within the scope of the device, provided that some portion of the body wall on the opposite side of the sea cucumber from the full incision is left intact. The wedge is positioned to split the sea cucumber at the point of incision as the sea cucumber progresses (either by gravity, conveyor belts, water pressure or some other means) past the blade. The wedge is formed in the leading/front edge of a first flattening plate, so as the sea cucumber is split, it is immediately sandwiched between the underside of the first flattening plate and the opposite side of the processing channel—referred to for convenience as the second flattening plate, which might also be a conveyor belt or some other surface.

Once aligned, cut and split, the sea cucumber is available for further processing in a modular fashion. As it is typically desirable to remove the sea cucumber innards/viscera for other uses or simply for cleaning prior to eating, the next stage discussed is the evisceration and cleaning stage. The apparatus may be adapted for vacuum evisceration by providing a hole in the first flattening plate after the wedge, and a vacuum tube connected at that hole to suck the viscera as the sea cucumber is pulled or pushed along the processing line. Alternatively or additionally, brushes and water jets immediately following the first flattening plate spray and rinse the exposed body cavity/coelomic cavity of the sea cucumber. In order to overcome the forces from the brushes and water which might accelerate the sea cucumber through the apparatus without completing the cleaning, pronged restriction discs moving at the desired speed can control the velocity of the sea cucumber without undue harm to the meat. Multiple cleaning stages may be used.

For convenience, in the discussion below, we assume the blade is above the sea cucumber as it moves horizontally through the apparatus by means of conveyor belts, but may be oriented below or to the side provided that the wedge is positioned in a corresponding fashion.

In horizontal operation, the sea cucumber is positioned longitudinally in on a middle belt within a series of parallel belts forming a trough, which pull the sea cucumber towards a cutting blade (including a blade or circular saw). An upper guide together with the lower trough may also form an input channel to squeeze the sea cucumber or form a narrowing passage towards the blade. The blade is disposed to cut the upper half of the aligned sea cucumber from mouth to anus, but may slightly over or under cut within the tolerance of the device and differences in the sea cucumbers. The blade may be of adjustable height. The functionality and structure of parts in the cutting stage provides an automated cutting mechanism for sea cucumber processing.

Immediately past the blade, a wedge shaped flattening plate is positioned to spread the cut in the sea cucumber made by the blade and sandwich the split carcass against the opposite side of the device. The flattening plate prevents the sea cucumber from rolling back into itself after being cut, and facilitates processing. The front flattening plate may be in a plane parallel to that of the one or more conveyor belts which follow the blade.

Alternatively, the upper front flattening plate may be inclined slightly to narrow the space above the conveyor belt in the direction of motion within the device. The functionality and structure of parts in the splitting stage provides an automated splitting and flattening mechanism for sea cucumber processing.

Alternatively, the front flattening plate may be provided with a hole to permit a suction attachment to remove viscera of the sea cucumber passing below the hole, as an optional evisceration vacuum at the commencement of the cleaning stage.

After the trailing edge of the flattening plate, the scrub and rinse style evisceration and cleaning stage of the apparatus involves one or more cylindrical brushes and a water jet manifold which scrub and rinse the sea cucumber viscera from the meat. The positions of the parts prevent the sea cucumber meat from rolling into itself within any gaps in the upper flattening plates. To further prevent the brushes and water jets from accelerating the sea cucumber through the machine, additional pronged discs between the conveyor belts may provide additional resistance and keep the sea cucumber from sliding off its position on the conveyor belt as it passes through the cleaning stage. The functionality and structure of parts in the cleaning stage provides an automated evisceration and cleaning stage for sea cucumber processing.

Trays beneath the cleaning stage may capture the water and viscera material for straining and further processing of the viscera, or simply to hygienically process and dispose of the waste water.

Following the cleaning stage, additional upper flattening plates may be used to keep the sea cumber in the easier to process flattened state as the sea cucumber is directed for further processing.

BRIEF DESCRIPTION OF THE DRAWINGS

The apparatus and method will be described in relation to the drawings in which:

FIG. 12(a) and FIG. 12(b) are top and side views, respectively, corresponding to FIG. 10(a) and FIG. 10(b), with the sea cucumber 37 entering the splitting stage.

FIG. 13(a) and FIG. 13(b) are top and side views, respectively, corresponding to FIG. 10(a) and FIG. 10(b), with the sea cucumber 37 exiting the splitting stage.

FIG. 14(a) and FIG. 14(b) are top and side views, respectively, corresponding to FIG. 10(a) and FIG. 10(b), with the sea cucumber 37 below the vacuum hole 38 in the front flattening plate 23.

FIG. 16(a) and FIG. 16(b) are top and side views, respectively, corresponding to FIG. 10(a) and FIG. 10(b), with the processed sea cucumber 37 departing the cleaning stage.

DETAILED DESCRIPTION

One or more examples of the sea cucumber processing machine and the related methods of use will now be explained in greater detail with reference to the accompanying figures.

Figure 1:
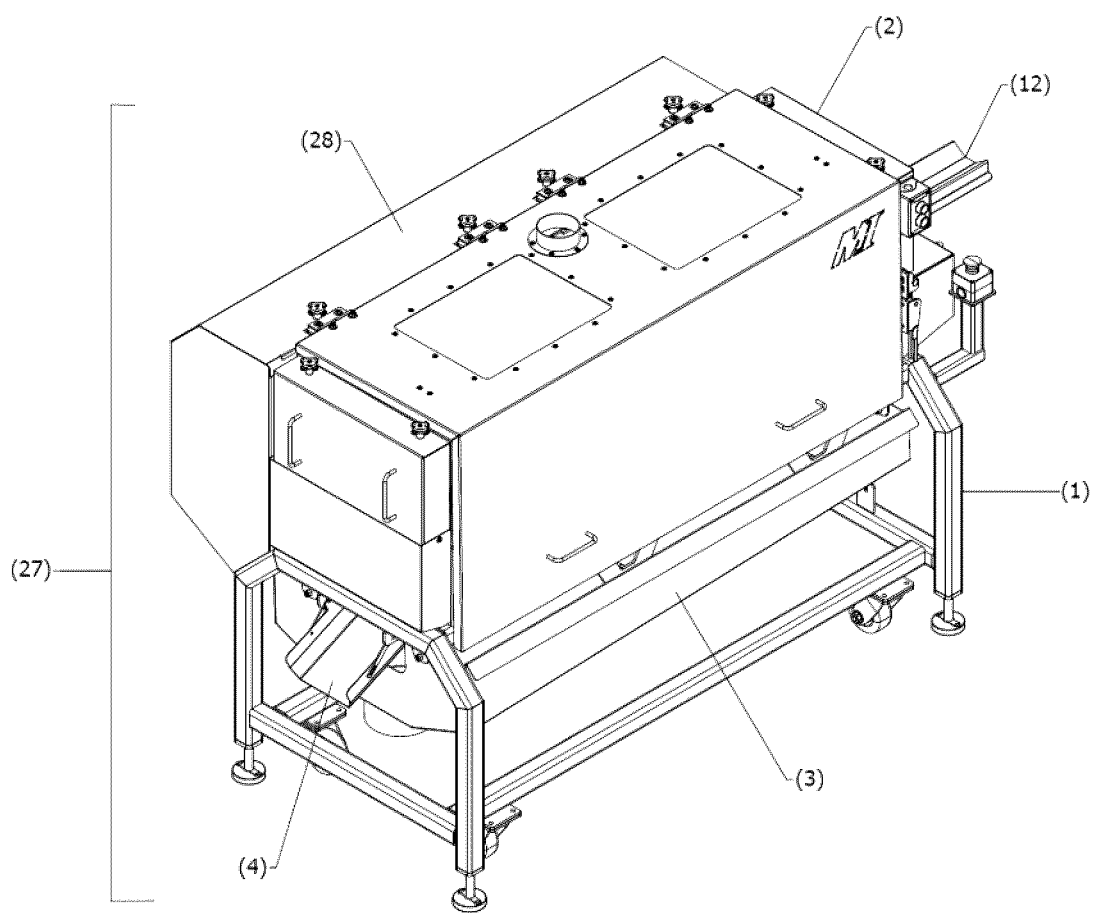
FIG. 1 is a top perspective view of an example sea cucumber processing machine.

In one aspect, as shown in FIG. 1, the sea cucumber processing apparatus is a complete machine 27 having a lower feed guide 12, a housing 28, and an output chute 4. A sea cucumber is placed, either by a user or from an orienting device, longitudinally in the lower feed guide 12 from where the sea cucumber would be pulled into the machine for processing. In the example shown, the machine's lower assembly 1 supports a sea cucumber carcass through the operational steps of cutting, splitting, flattening, cleaning and outputting the meat for possible packaging or further processing. The machine 27 may comprise a viscera collection tray 3 to collect and process waste water and sea cucumber viscera for other purposes.

FIGS. 2, 3, 4, 5, 6, 7, 8 and 9 each show different view of the same example machine or parts thereof from different angles and exposure.

Figure 2:
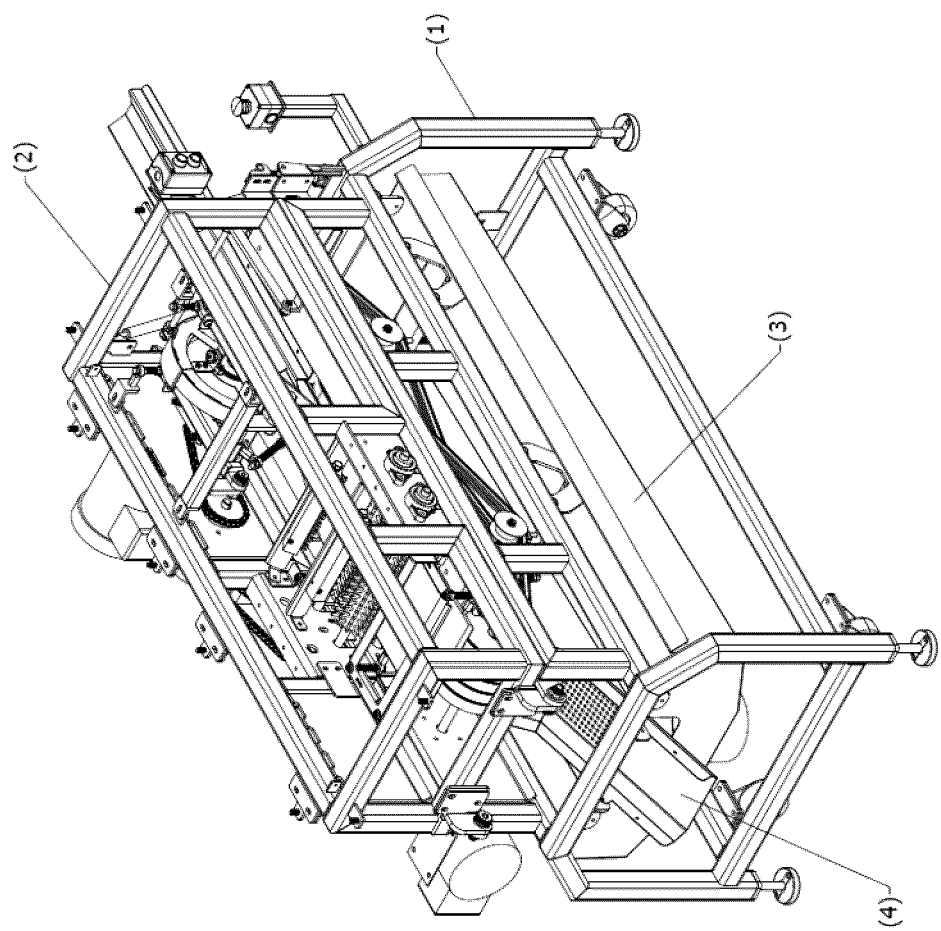
FIG. 2 is a top perspective view of the sea cucumber processing machine of FIG. 1 from which the housing has been removed to expose the parts.

In FIG. 2 the housing has been removed, and the machine lower assembly 1 is shown connected to the machine upper assembly 2. Also shown are the viscera collection tray 3 and output chute 4.

Figure 3:
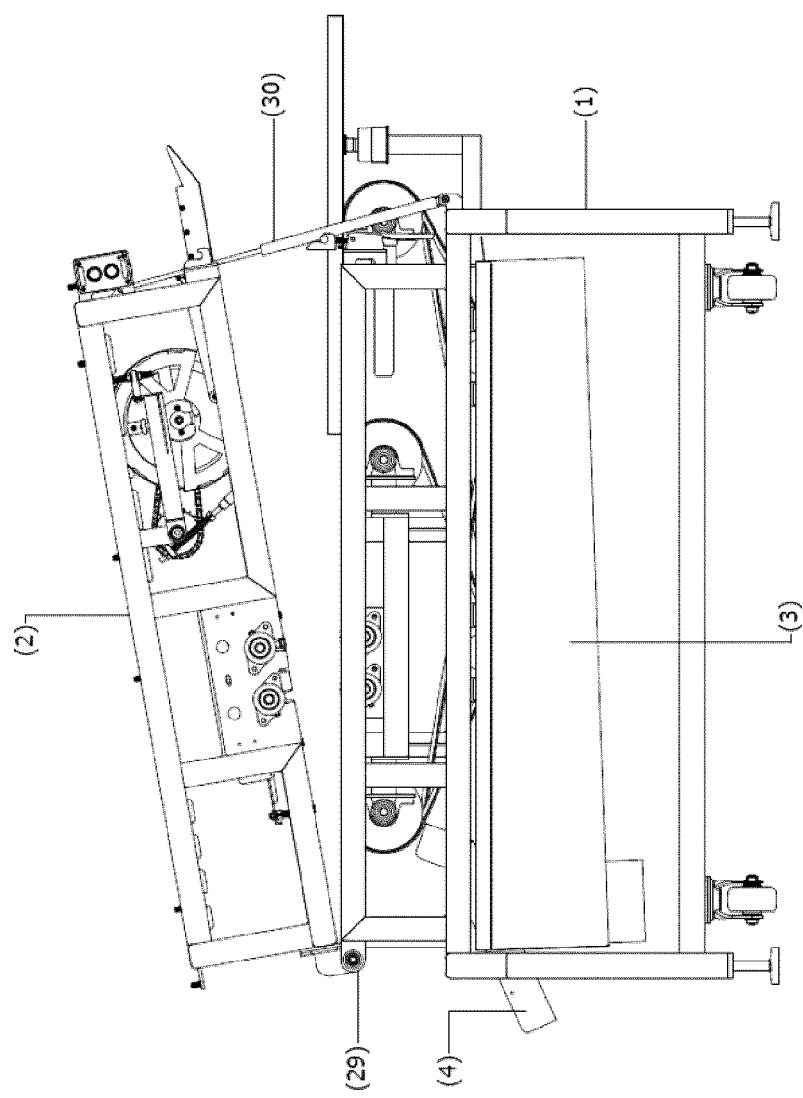
FIG. 3 is a side view of the exposed sea cucumber processing machine of FIG. 2.

In FIG. 3, the machine upper assembly 2 is opened for cleaning from back hinge 29 and held open by forward struts 30.

Figure 4:
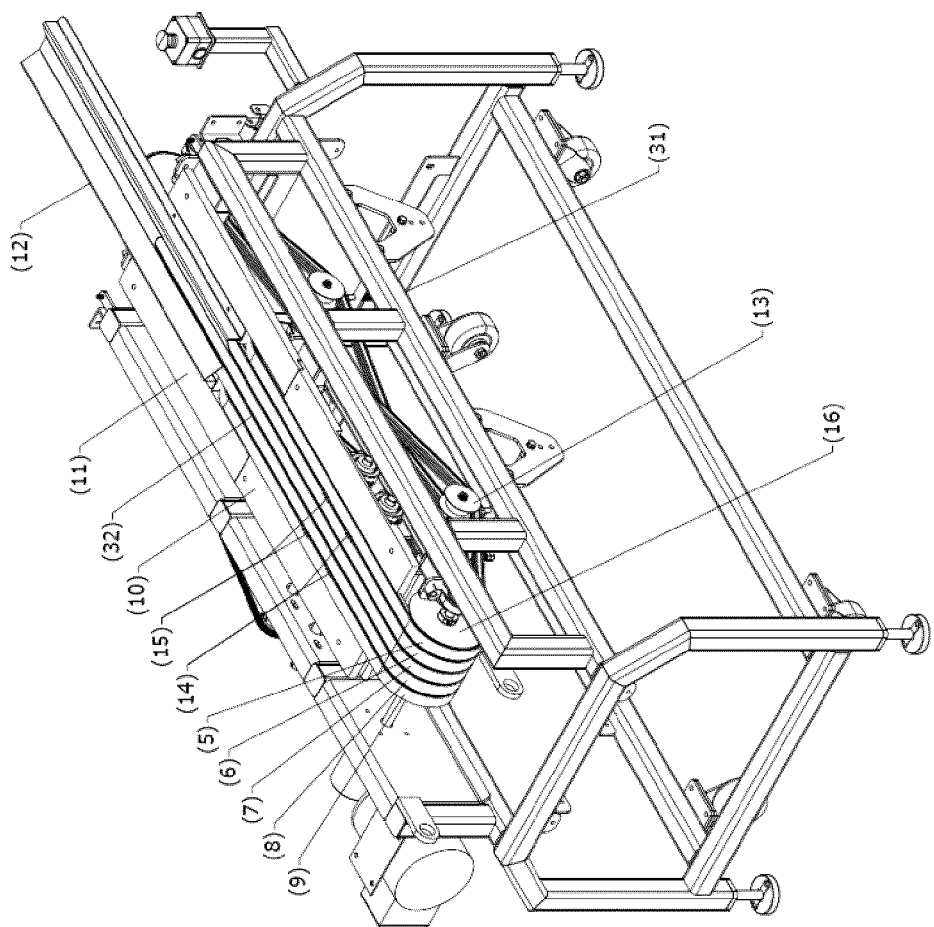
FIG. 4 is a top perspective view of the machine lower assembly 1 of the exposed sea cucumber processing machine of FIG. 2.

FIG. 4 shows only the machine lower assembly 1, in which a stand 31 supports a transport assembly 32 comprising front belt guide plate 11, rear belt guide plate 10, lower feed guide 12, belt tensioner assembly 13, optional rear restriction disc assembly 14, optional front restriction disc assembly 15, drive roller assembly 16, and a plurality of spiked belts, 5, 6, 7, 8 and 9. The spikes on the middle belt 7 grip a sea cucumber to pull it into the machine for processing, and the spikes on the other belts grip the sea cucumber skin as the sea cucumber is progressively cut, split and flattened in the machine. Together, the spiked belts, 5, 6, 7, 8 and 9, form a conveyor belt, and the gaps between the spiked belts can be referred to as conveyor belt spacings or simply spacings.

Figure 5:
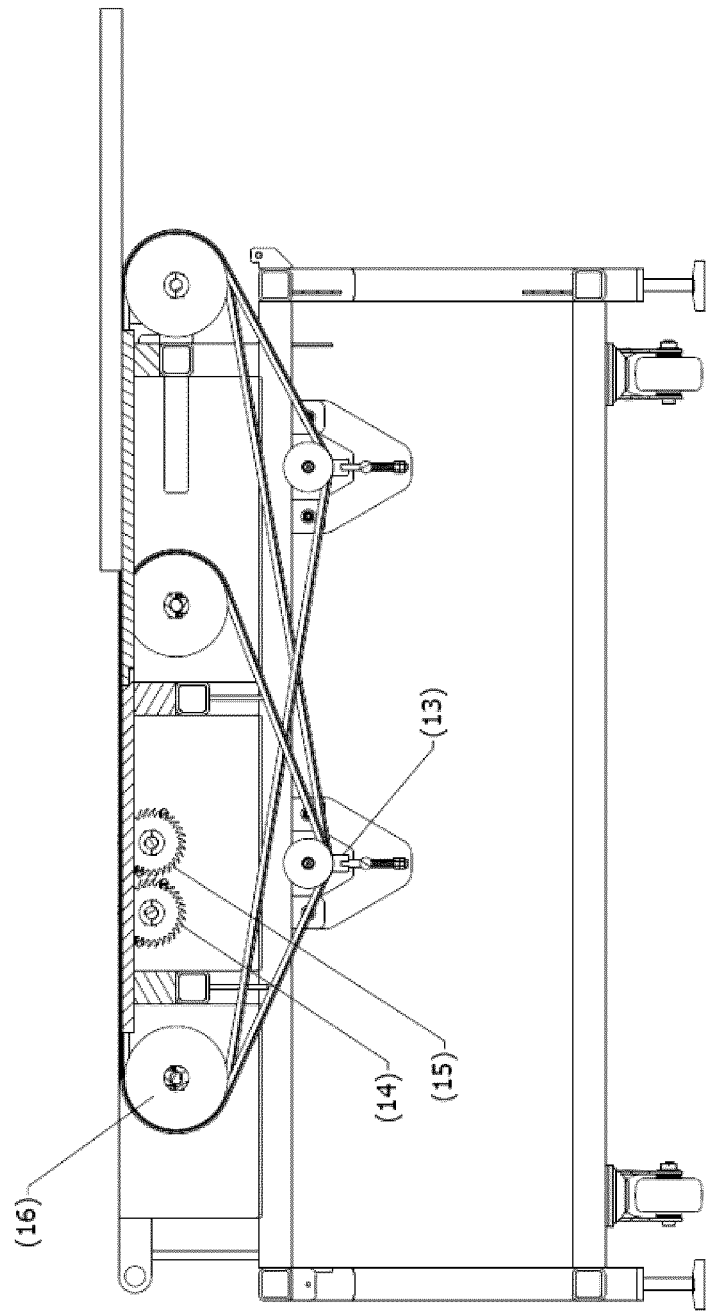
FIG. 5 is a side view of the machine lower assembly 1 of the exposed sea cucumber processing machine of FIG. 2.

As shown in FIG. 5, as the drive roller assembly 16 turns, the spiked belts 5, 6, 7, 8 and 9, move at a common speed about the tensioning assembly 13. Optional rear restriction disc assembly 14 and front restriction disc assembly 15 have restriction discs with radial prongs protruding above the conveyor belt spacings to provide additional connection to the sea cucumber to prevent the sea cucumber from moving faster than the belts during the cleaning stages—discussed further below.

Figure 6:
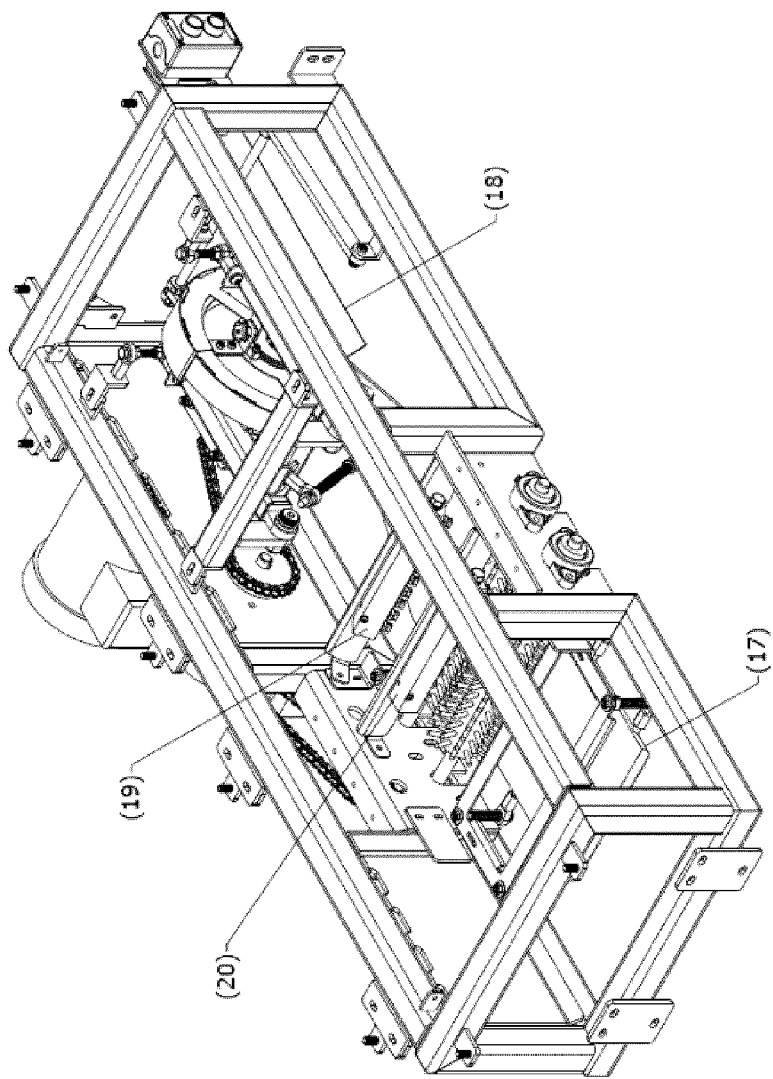
FIG. 6 is a top perspective view of the machine upper assembly 2 of the exposed sea cucumber processing machine of FIG. 2.

FIG. 6 shows the machine upper assembly 2, with upper feed guide assembly 18, for positioning above the lower feed guide assembly 1 so as to form a narrowing input channel.

As the sea cucumber is pulled by the belt into the machine, the upper feed guide assembly 18 and lower feed guide assembly 12 center the sea cucumber as it is directed into the machine. The front water spray manifold 19, rear water spray manifold 20 and rear flattening plate 17 are also shown.

Figure 7:
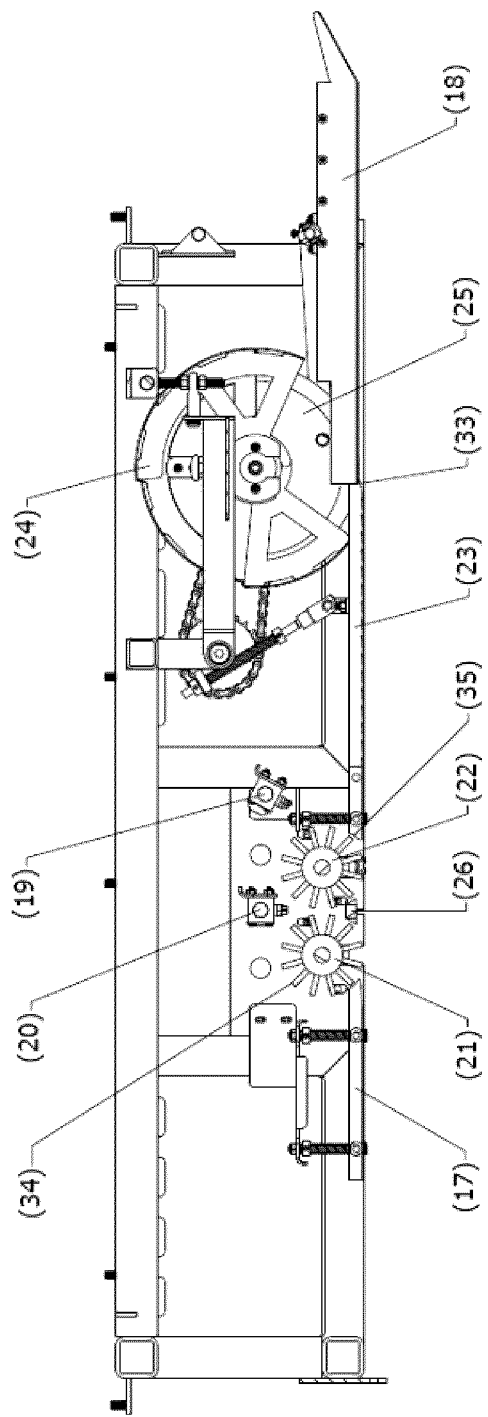
FIG. 7 is a side view of the machine upper assembly 2 of the exposed sea cucumber processing machine of FIG. 2.

In the side view of FIG. 7, the blade 25 is sized and positioned to cut the upper skin, muscle and wall of the sea cucumber without cutting the lower wall. In the example shown (as more particularly shown in FIGS. 10(*a*) and 10(*b*)), the blade 25 is positioned within slots/guides of the forward point of the wedge 33 and the front flattening plate assembly 23. The forward point of the wedge 33 spreads the incision formed by the blade, and resists the natural tendency of the sea cucumber flesh to roll inward upon itself when cut, and splits the cut sea cucumber outward and flattens it for further processing. The front flattening plate assembly 23 maintains the sea cucumber in a flat position and prevents the inward roll. In the example shown, the belt 7, then belts 6, 7, 8 and finally all belts 5, 6, 7, 8 and 9, pull the cut and split sea cucumber past the wedge portion of the front flattening plate assembly 23, and under the wide portion of the front flattening plate assembly 23. Other belt configurations or designs are possible, including a single belt (in which can the restriction discs could be mounted between the brushes. The configuration in the example permits the optional rear restriction disc assembly 14 and front restriction disc assembly 15 to be used as shown.

The evisceration stage of sea cucumber processing presents a number of design challenges related to the tendency of the sea cucumber to roll and slip. In the example shown, the evisceration stage of the machine addresses these design challenges and includes some features for additional robustness. At a basis level, the sea cucumber is pulled by the belts as it is pressed between the belts and the upper flattening plate. As it is pulled past the trailing edge 35 of the front flattening plate 23 a front roller brush 22 scrubs the visceral material from the exposed meat of the sea cucumber, and then the sea cucumber is pressed by the intermediate plate 26 (alternatively referred to as the first post-cleaning flattening plate) without sufficient gap to permit the sea cucumber meat to roll upward between the brush and the plates. Additionally, the water jets of the front water spray manifold 19 spray water onto the bristles 34 of the brushes 21 and 22, as they pass between the gap formed by the brush roller 22 and the trailing edge 35 of the front plate 23.

Figure 8:
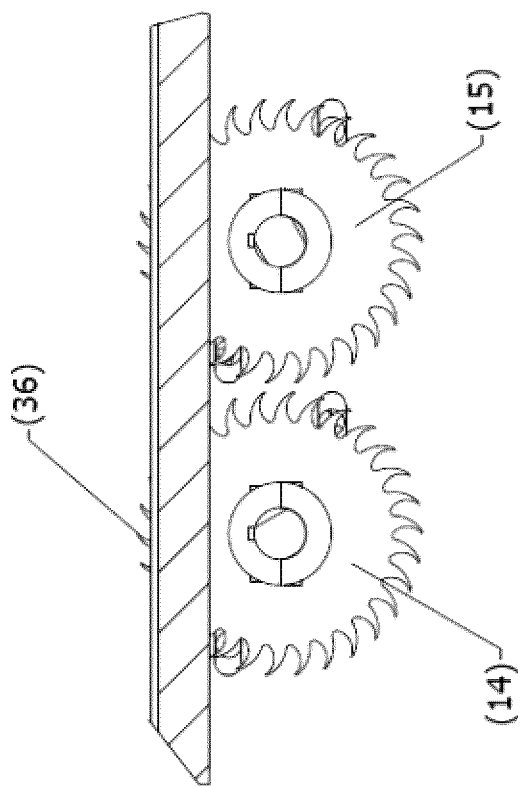
FIG. 8 is a side view of the restriction discs of the machine lower assembly 1 of the exposed sea cucumber processing machine of FIG. 2.
Figure 9:
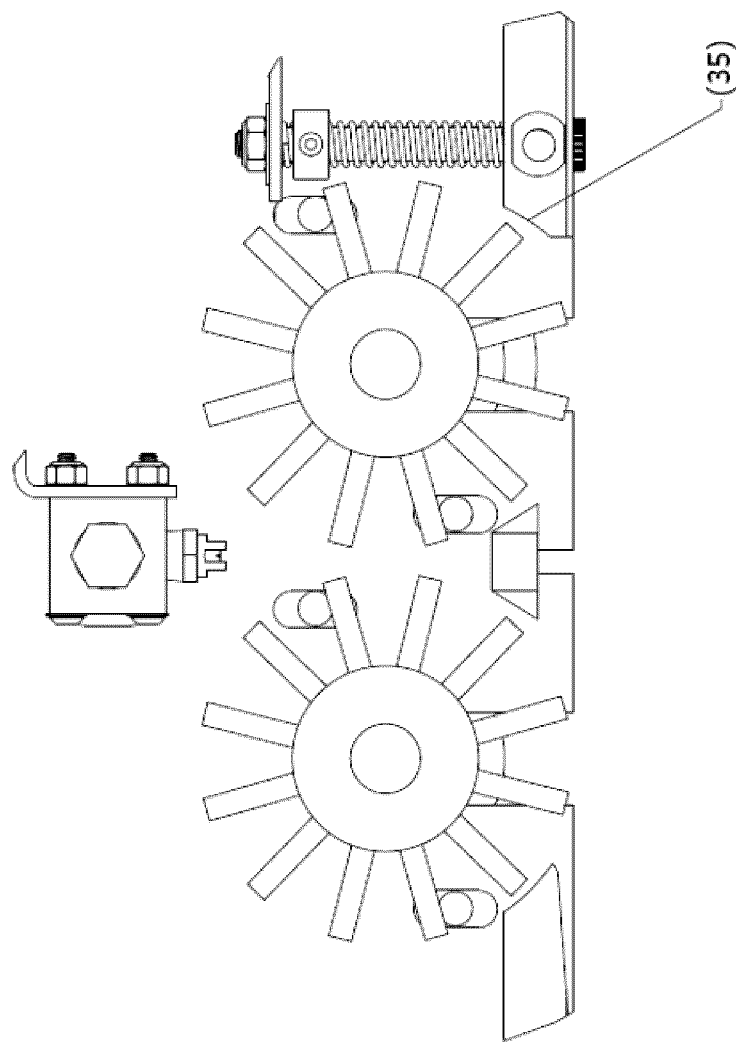
FIG. 9 is a side view of the brush assembly of the machine upper assembly 2 of the exposed sea cucumber processing machine of FIG. 2.

As shown in FIG. 8, in order to further prevent the brushes and water from accelerating the sea cucumber forward without cleaning, the prongs 36 on the front restriction disc assembly 15 prevent the sea cucumber from moving substantially faster than the belts 5, 6, 7, 8 and 9. The rear restriction disc assembly 14 provides the function in respect of the rear brushes and water. The water and visceral material falls into water and viscera collection tray 3 (shown in FIG. 3), where it can be strained for collection of the viscera and the water safely collected for treatment.

Optionally, a vacuum attachment may be positioned above the front flattening plate 23 to pull the viscera upward through opening 38 in the front flattening plate as the sea cucumber is pulled along by the belts 5, 6, 7, 8 and 9. The bulk of the viscera is detached from the inner wall of the sea cucumber and transported by vacuum to a collection vessel. The remaining viscera may then be removed by the brushes 21 and 22, and spray nozzles 19 and 20. Viscera removed by vacuum is more whole than viscera removed by brushing and can be of higher quality.

Optionally, in the example of FIG. 7, the flattening plate after the front brush assembly is the centre flattening plate 26, and it is followed by a second stage of cleaning by rear brush assembly 21, rear water spray manifold 20, rear restriction disc assembly 14 (as shown in FIG. 8), and the belts 5, 6, 7, 8 and 9 before further flattening by the rear flattening plate assembly 17. The second stage cleaning happens in an analogous fashion to the first stage. Although it is within the scope of the invention for the brushes and water to point in the other direction and using the driving restriction discs to provide additional forward force, the system functions more smoothly with all parts encouraging motion through the machine. A common water and viscera collection tray 3 (of FIG. 3), can be used to collect the viscera and the water from both the first and second stages of cleaning.

Finally, the belts 5, 6, 7, 8 and 9 pull the split and cleaned sea cucumber to a discharge area for further processing. In the example shown, the discharge area is a chute, but it could also be towards a skin removal stage, skin cleaning stage, cooker, drying, freezer or other processing machinery which adapted to receive sea cucumber which has been cleaned, split and flattened.

Figure 10:
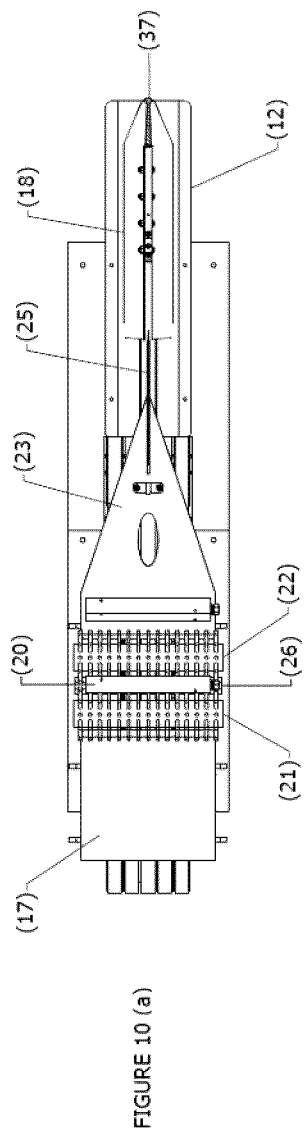
FIG. 10(a) is a top view of the machine of FIG. 2 with the housing and support structure removed.
FIGS. 10(b) is a side view of the machine of FIG. 2 with the housing and support structure removed.
Figure 10:
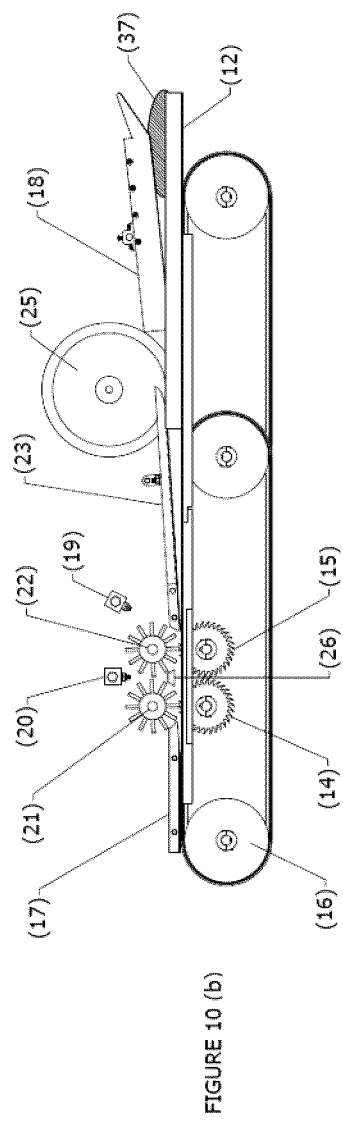
Figure 11:
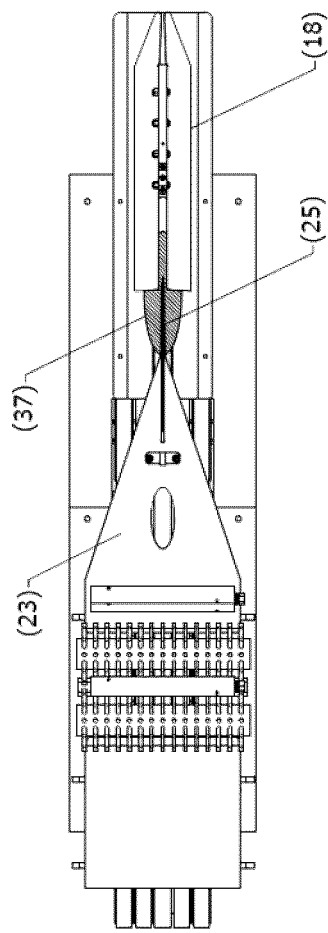
FIG. 11(a) and FIG. 11(b) are top and side views, respectively, corresponding to FIG. 10(a) and FIG. 10(b), with a sea cucumber 37 meeting the cutting stage.
Figure 11:
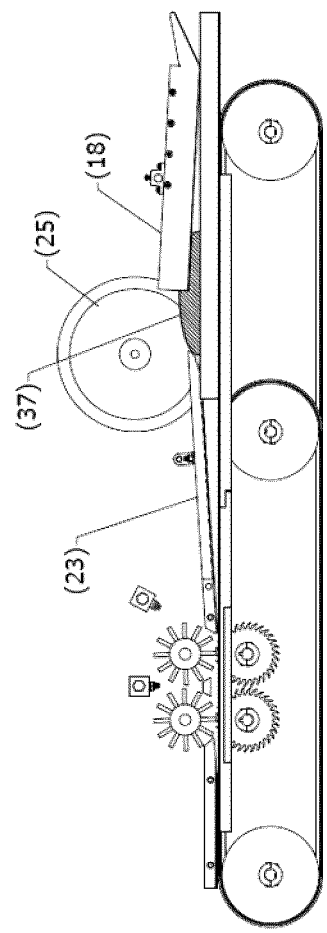
Figure 15:
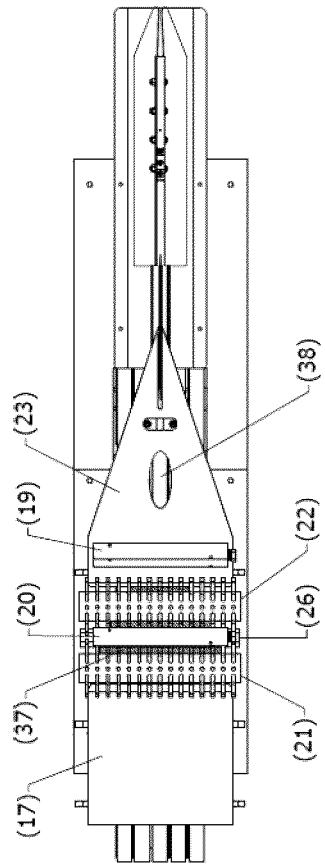
FIG. 15(a) and FIG. 15(b) are top and side views, respectively, corresponding to FIG. 10(a) and FIG. 10(b), with the processed sea cucumber 37 in the cleaning stage.
Figure 15:
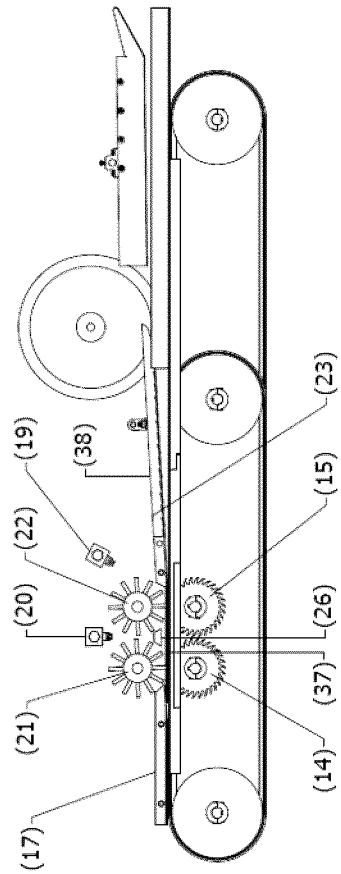

FIGS. 10 through 16 show the live sea cucumber 37 as it enters the machine (FIGS. 10(*a*) and (*b*)), is guided into the cutting blade (FIGS. 11(*a*) and (*b*)), is cut and progressively flattened by the front flattening plate (FIGS. 12(*a*) and (*b*) and 13(*a*) and (*b*)). The cut, split and flattened sea cucumber 37 passes through the machine beneath the flattening plates to an optional viscera suction mechanism (FIGS. 14(*a*) and (*b*)), or simply goes to the cleaning stage of the spray nozzles and brushes (FIGS. 15(*a*) and (*b*)), and the fully processed sea cucumber ejected from the machine by the belts (FIGS. 16(*a*) and (*b*)).

The advantages of the method of processing the sea cucumber using the device disclosed herein can be described in one or more of the following steps or stages in reference to the figures:

i. Aligning—FIGS. 10(*a*) and 10(*b*): the sea cucumber 37 is aligned and elongated by an input channel formed where an upper feed guide 18 forms a channel with a lower feed guide 12 to align the sea cucumber 37;

ii. Cutting—FIGS. 11(*a*), 11(*b*), 12(*a*) and 12(*b*): the sea cucumber 37 is cut by a blade 25 positioned vertically over the centre of the lower feed guide 12, and the incision goes from skin surface, through an upper lateral wall to viscera without cutting a bottom lateral wall, from mouth to anus of the sea cucumber, as the conveyor belt 7 pulls the sea cucumber 37;

iii. Splitting—FIGS. 11(*a*), 11(*b*), 12(*a*) and 12(*b*): the sea cucumber 37 is split by a forward flattening plate 23 having a wedge shaped leading edge 33 disposed about a trailing edge of the blade 25, which splits the sea cucumber 37 along the cut as the conveyor belt 5, 6, 7, 8 and 9 pulls the sea cucumber under a bottom side of the forward flattening plate 23;

iv. Flattening—FIGS. 13(*a*) and 13(*b*): the sea cucumber 37 is now flattened between forward flattening plate 23 and the opposite side of processing channel on which the convey belts belt 5, 6, 7, 8 and 9 pull the sea cucumber for additional processing.

v. Optional Evisceration—FIGS. 14(*a*) and 14(*b*): the sea cucumber 37 may be eviscerated in a manner to preserve high quality viscera material for future processing by a vacuum nozzle and hole 38 in the front flattening plate 23 which permit removal of some viscera by suction during flattening.

vi. Cleaning—FIGS. 15(a) and 15(b): Two stages of cleaning are shown. A first cleaning stage, where at a front gap between a trailing edge 35 of the front flattening plate 23 and a leading edge of a central flattening plate 26, a rotating front brush 22 scrubs viscera from the inner wall of the sea cucumber 37 and a front water spray manifold 19 sprays water on the front brush 22 where the front brush 22 contacts the sea cucumber 37 while restraining prongs 36 on a front restriction disc 15 (see FIG. 8) which protrude above the conveyor belt 5, 6, 7, 8 and 9 to attach under the sea cucumber 37 to resist acceleration of the sea cucumber 37 by the front brush 22, as the conveyor 5, 6, 7, 8 and 9 pulls the sea cucumber 37 towards a second cleaning stage, where at a rear gap between a trailing edge of the central flattening plate 26 and a leading edge of a rear flattening plate 17, a rotating rear brush 21 scrubs the inner wall of the sea cucumber and a rear water spray manifold 20 sprays water on the rear brush 21 where the rear brush 21 contacts the sea cucumber 37 while restraining prongs 36 on a rear restriction disc 14 (see FIG. 8) which protrude above the conveyor belt 5, 6, 7, 8 and 9 to attach under the sea cucumber 37 to resist acceleration of the sea cucumber by the rear brush 21.

vii. Output—FIGS. 16(a) and 16(b) show the sea cucumber 37 exiting the apparatus past the rear flattening plate 17.

The foregoing examples and advantages are merely exemplary and are not to be construed as limiting the present inventions. The present teaching can be readily applied to other types of apparatuses and machines, or use thereof. Also, the descriptions of the examples of the present inventions are intended to be illustrative, and not to limit the scope of the claims, and many alternatives, modifications, and variations will be apparent to those skilled in the art. In particular, the individual structural elements claimed as being may be practiced alone and not in combination with other stages of the machine and remain independently inventive.

The invention claimed is:

1. A sea cucumber processing apparatus comprising:
   a. a conveyor belt for moving sea cucumber successively through;
   b. an input channel which narrows towards a blade;
   c. the blade to make an incision through sea cucumber body wall longitudinally from mouth to anus as sea cucumber exits the input channel, exposing viscera, and
   d. a wedge formed in a forward edge of a first flattening plate disposed about a trailing edge of the blade, the first flattening plate positioned to create a first flattening gap between the conveyor belt and the first flattening plate to flattening sea cucumber against the conveyor belt and prevent inward rolling.

2. The sea cucumber processing apparatus of claim 1, wherein the conveyor belt comprises a plurality of belt portions spaced apart by spacings, and
wherein the conveyor belt continues past the first flattening plate towards one or more cleaning stages each comprising:
   a. one or more rotating brushes and water jets to scrub viscera from sea cucumber,
   b. where between spacings in the conveyor belt, one or more restraining discs opposite the rotating brushes have radial prongs protruding above the conveyor belt are limited to rotating at the speed of the conveyor belt;
   c. a post-cleaning flattening plate after the rotating brushes; wherein
   d. distance between the rotating brushes and the post-cleaning flattening plate is too narrow to receive sea cucumber carcass.

3. The sea cucumber processing apparatus of claim 2 further comprising trays below the conveyor belt to collect waste water and viscera.

4. The sea cucumber processing apparatus of claim 1 wherein the first flattening plate has a hole after the wedge connected to a vacuum to suction exposed viscera of the sea cucumber through the hole for separate collection and processing.

5. The sea cucumber processing apparatus of claim 1 wherein the first flattening plate is parallel to the conveyor belt.

6. The sea cucumber processing apparatus of claim 1 wherein the first flattening plate inclines towards the conveyor belt after the wedge to narrow the first flattening gap.

7. The sea cucumber processing apparatus of claim 1 wherein a cutting depth of the blade is adjustable.

8. The sea cucumber processing apparatus of claim 1, wherein the conveyor belt comprises a plurality of belt portions spaced apart by spacings, and the apparatus further comprise;
   a. one or more cleaning stages after the first flattening plate, each comprising:
      i. one or more rotating brushes and water jets to scrub viscera from sea cucumber;
      ii. where between spacings in the conveyor belt, one or more restraining discs opposite the rotating, brushes have radial prongs protruding above the conveyor belt and are limited to rotating at the speed of the conveyor belt;
      iii. a post-cleaning flattening plate after the rotating brushes: wherein
      iv. distance between the rotating brushes and the post-cleaning flattening plate is too narrow to receive sea cucumber carcass;
   b. trays below the conveyor belt to collect waste water and visera;
   c. the first flattening plate has a hole after the wedge connected to a vacuum to suction exposed viscera of the sea cucumber through the hole for separate collection and processing;
   d. the first flattening plate inclines towards the conveyor belt after the wedge to narrow the first flattening gap; and
   e, a cutting depth of the blade is adjustable.

9. A method of processing a sea cucumber comprising the steps of:
   a. Obtaining a sea cucumber;
   b. Placing the sea cucumber longitudinally on a conveyor belt in an input channel formed between a lower feed guide and an upper feed guide narrowing in the direction of the conveyor belt;
   c. Conveying the sea cucumber through the input channel to align and elongate the sea cucumber for additional processing.

10. The method of claim 9 further comprising the steps of:
   d. Cutting an incision longitudinally through an upper body wall of the sea cucumber, from mouth to anus as the sea cucumber is conveyed through an exit from the input channel.

11. The method of claim 10 further comprising the steps of e. immediately after cutting, splitting the incision in the sea cucumber by conveying the sea cucumber into a wedge in a first flattening plate; and f. flattening the sea cucumber by conveying it into a first flattening gap between the first flattening plate and the conveyor belt.

12. The method of claim 11 further comprising the steps of;

g. Cleaning exposed viscera from the sea cucumber by conveying the sea cucumber through one of more cleaning stages after the first flattening plate in which:

i. rotating brushes and water jets scrub and rinse the sea cucumber, while radial prongs rotating at the speed of the conveyor belt prevent acceleration of the sea cucumber during cleaning; and ii. immediately after the rotating brushes, a post-cleaning flattening plate restricts the sea cucumber from rolling inward or about the brushes as the sea cucumber moves with the conveyor belt.

13. The method of claim 12 further comprising the steps of:

f.1 suctioning exposed viscera from the sea cucumber through a hole in the first flattening plate as the sea cucumber is conveyed beneath the first flattening plate.

14. The method of claim 9, further comprising the upper feed guide applying pressure to the sea cucumber and retaining the sea cucumber in contact with the conveyor belt.

15. The method of claim 14, wherein at least a portion of a surface of the conveyor belt comprises outwardly-projecting spikes retaining the sea cucumber in contact with the conveyor belt.

16. An apparatus for processing sea cucumber comprising an input channel for receiving, aligning, and elongating a sea cucumber, the input channel comprising:

a. a longitudinally extending lower feed guide and b. a longitudinally extending upper feed guide, wherein the lower and upper feed guides, cooperatively define a channel inlet longitudinally spaced apart form a channel outlet, wherein the upper feed guide is on a hinge to allow the input channel to narrow longitudinally about the sea cucumber between the channel inlet and the channel outlet as the sea cucumber exits the input channel to elongate the sea cucumber along the longitudinal axis of the sea cucumber within the input channel.

17. The apparatus of claim 16 further comprising a simultaneous cutting, splitting and flattening stage in which:

a. a blade positioned after the input channel to cut an incision longitudinally through one side of a body wall of a sea cucumber, as the sea cucumber exits the input channel;

b. a forward wedge of a first flattening plate positioned after the blade and parallel to a second flattening plate, the first flattening plate and the second flattening plate separated by a distance approximately half the minimum cross-sectional width of the sea cucumber;

c. such that the forward wedge splits the sea cucumber at the incision as it progresses through the apparatus and the sea cucumber is immediately flattened between the first flattening plate and the second flattening plate.

18. The apparatus of claim 17, wherein the upper feed guide and the lower feed guide align the sea cucumber with the blade and the first flattening plate.

19. The apparatus of claim 18, further comprising a conveyor belt for moving the sea cucumber successively through the apparatus, and wherein the upper feed guide applies pressure to the sea cucumber and retains the sea cucumber in contact with the conveyor belt.

20. The apparatus of claim 19, wherein at least a portion of a surface of the conveyor belt comprises outwardly-projecting spikes that retain the sea cucumber in contact with the conveyor belt.

* * * * *